US007493470B1

(12) United States Patent
Cumplido et al.

(10) Patent No.: US 7,493,470 B1
(45) Date of Patent: Feb. 17, 2009

(54) PROCESSOR APPARATUS AND METHODS OPTIMIZED FOR CONTROL APPLICATIONS

(75) Inventors: Rene Cumplido, Colon (MX); Roger Goodall, Leics (GB); Simon Jones, Bath (GB)

(73) Assignee: ARC International, PLC, Elstree, Herts (GB)

( * ) Notice: Subject to any disclaimer, the term of this patent is extended or adjusted under 35 U.S.C. 154(b) by 681 days.

(21) Appl. No.: 10/313,548

(22) Filed: Dec. 6, 2002

Related U.S. Application Data

(60) Provisional application No. 60/340,641, filed on Dec. 7, 2001.

(51) Int. Cl.
  G06F 9/30 (2006.01)
  G06F 9/40 (2006.01)
  G06F 15/00 (2006.01)

(52) U.S. Cl. .................... 712/34; 712/227; 712/210; 712/36

(58) Field of Classification Search .................... 712/35, 712/36, 227, 34
See application file for complete search history.

(56) References Cited

U.S. PATENT DOCUMENTS

| | | | | |
|---|---|---|---|---|
| 3,875,391 A | * | 4/1975 | Shapiro et al. | 708/521 |
| 4,310,879 A | * | 1/1982 | Pandeya | 712/32 |
| 4,638,248 A | | 1/1987 | Schweickert | |
| 4,763,242 A | | 8/1988 | Lee et al. | |
| 5,053,631 A | * | 10/1991 | Perlman et al. | 708/508 |
| 5,187,796 A | * | 2/1993 | Wang et al. | 712/4 |
| 5,361,373 A | | 11/1994 | Gilson | |
| 5,404,319 A | | 4/1995 | Smith et al. | |
| 5,448,746 A | | 9/1995 | Eickemeyer et al. | |
| 5,450,586 A | | 9/1995 | Kuzara et al. | |
| 5,488,710 A | | 1/1996 | Sato et al. | |
| 5,488,730 A | | 1/1996 | Brown et al. | |
| 5,491,640 A | | 2/1996 | Sharma et al. | |
| 5,493,508 A | | 2/1996 | Dangelo et al. | |
| 5,502,661 A | | 3/1996 | Glunz | |
| 5,535,331 A | | 7/1996 | Swoboda et al. | |

(Continued)

FOREIGN PATENT DOCUMENTS

DE 196 47 744 A1 6/1996

(Continued)

OTHER PUBLICATIONS

Designing and Programming The Emotion Engine by Masaaki Oka and Masakazu Suzuoki, Sony Computer Entertainment, IEEE Journal, Nov.-Dec. 1999, pp. 20-28.

(Continued)

Primary Examiner—Eddie P Chan
Assistant Examiner—Corey S Faherty
(74) Attorney, Agent, or Firm—Ropes & Gray LLP

(57) ABSTRACT

Apparatus and methods for real-time control using a data processor. In one aspect, the invention comprises an improved processor having one or more extension instructions (and associated supporting pipeline hardware) which are specially adapted for use in a real-time control algorithm running on the processor. In one exemplary embodiment, the processor is a 32-bit pipelined RISC device having custom multiply (CMUL) and multiply-accumulate (CMAC) instructions added to the extension instruction set to optimize algorithm performance in real-time linear time-invariant (LTI) applications. Specialized extension hardware, and methods for generating a processor design adapted for real-time control applications are also disclosed.

29 Claims, 8 Drawing Sheets

U.S. PATENT DOCUMENTS

| | | | |
|---|---|---|---|
| 5,537,580 | A | 7/1996 | Giomi et al. |
| 5,544,067 | A | 8/1996 | Rostoker et al. |
| 5,546,552 | A | 8/1996 | Coon et al. |
| 5,555,201 | A | 9/1996 | Dangelo et al. |
| 5,636,352 | A | 6/1997 | Bealkowski et al. |
| 5,638,525 | A | 6/1997 | Hammond et al. |
| 5,696,956 | A | 12/1997 | Razdan et al. |
| 5,740,461 | A | 4/1998 | Jaggar |
| 5,748,875 | A | 5/1998 | Tzori |
| 5,751,984 | A | 5/1998 | Chang et al. |
| 5,771,362 | A * | 6/1998 | Bartkowiak et al. ......... 710/317 |
| 5,794,010 | A | 8/1998 | Worrell et al. |
| 5,796,919 | A | 8/1998 | Kubica |
| 5,796,920 | A | 8/1998 | Hyland |
| 5,801,958 | A | 9/1998 | Dangelo et al. |
| 5,809,272 | A | 9/1998 | Thusoo et al. |
| 5,809,320 | A * | 9/1998 | Jain et al. ..................... 712/34 |
| 5,812,416 | A | 9/1998 | Gupte et al. |
| 5,819,050 | A | 10/1998 | Boehling et al. |
| 5,819,058 | A | 10/1998 | Miller et al. |
| 5,819,064 | A | 10/1998 | Razdan et al. |
| 5,841,663 | A | 11/1998 | Sharma et al. |
| 5,848,105 | A * | 12/1998 | Gardner et al. .............. 375/336 |
| 5,854,929 | A | 12/1998 | Van Praet et al. |
| 5,854,930 | A | 12/1998 | McLain et al. |
| 5,864,704 | A | 1/1999 | Battle et al. |
| 5,867,399 | A | 2/1999 | Rostoker et al. |
| 5,867,681 | A | 2/1999 | Worrell et al. |
| 5,870,576 | A | 2/1999 | Faraboschi et al. |
| 5,870,588 | A * | 2/1999 | Rompaey et al. .............. 703/13 |
| 5,881,260 | A | 3/1999 | Raje et al. |
| 5,884,057 | A | 3/1999 | Blomgren et al. |
| 5,896,519 | A | 4/1999 | Worrell |
| 5,898,595 | A | 4/1999 | Bair et al. |
| 5,905,893 | A | 5/1999 | Worrell |
| 5,920,478 | A | 7/1999 | Ekblad et al. |
| 5,935,235 | A * | 8/1999 | Angle et al. ................... 712/34 |
| 5,948,100 | A | 9/1999 | Hsu et al. |
| 5,953,238 | A | 9/1999 | Mowry et al. |
| 5,961,632 | A | 10/1999 | Shiell et al. |
| 5,978,752 | A | 11/1999 | Morris |
| 5,994,892 | A | 11/1999 | Turino et al. |
| 5,999,734 | A | 12/1999 | Willis et al. |
| 6,006,022 | A | 12/1999 | Rhim et al. |
| 6,009,256 | A * | 12/1999 | Tseng et al. ................... 703/13 |
| 6,009,505 | A * | 12/1999 | Thayer et al. ................... 712/6 |
| 6,016,543 | A | 1/2000 | Suzuki et al. |
| 6,026,219 | A | 2/2000 | Miller et al. |
| 6,035,123 | A | 3/2000 | Razdan et al. |
| 6,101,058 | A | 8/2000 | Morris |
| 6,110,223 | A | 8/2000 | Southgate et al. |
| 6,173,434 | B1 | 1/2001 | Wirthlin et al. |
| 6,182,206 | B1 | 1/2001 | Baxter |
| 6,195,593 | B1 | 2/2001 | Nguyen |
| 6,207,936 | B1 | 3/2001 | de Waard et al. |
| 6,209,079 | B1 | 3/2001 | Otani et al. |
| 6,219,833 | B1 * | 4/2001 | Solomon et al. ............. 717/149 |
| 6,223,274 | B1 * | 4/2001 | Catthoor et al. ............... 712/34 |
| 6,226,776 | B1 | 5/2001 | Panchul et al. |
| 6,269,467 | B1 | 7/2001 | Chang et al. |
| 6,282,633 | B1 | 8/2001 | Killian et al. |
| 6,317,860 | B1 | 11/2001 | Heile |
| 6,321,369 | B1 | 11/2001 | Heile et al. |
| 6,324,678 | B1 | 11/2001 | Dangelo et al. |
| 6,338,136 | B1 | 1/2002 | Col et al. |
| 6,360,350 | B1 | 3/2002 | Gabele et al. |
| 6,378,123 | B1 | 4/2002 | Dupenloup |
| 6,385,757 | B1 | 5/2002 | Gupta et al. |
| 6,389,335 | B1 | 5/2002 | Vos |
| 6,401,107 | B1 | 6/2002 | Yang et al. |
| 6,404,581 | B1 | 6/2002 | Shah |
| 6,408,428 | B1 | 6/2002 | Schlansker et al. |
| 6,412,066 | B2 | 6/2002 | Worrell et al. |
| 6,421,818 | B1 | 7/2002 | Dupenloup et al. |
| 6,425,070 | B1 * | 7/2002 | Zou et al. ...................... 712/35 |
| 6,438,678 | B1 * | 8/2002 | Cashman et al. .............. 712/34 |
| 6,457,173 | B1 | 9/2002 | Gupta et al. |
| 6,463,520 | B1 | 10/2002 | Otani et al. |
| 6,477,683 | B1 * | 11/2002 | Killian et al. ................... 716/1 |
| 6,477,697 | B1 | 11/2002 | Killian et al. |
| 6,490,118 | B1 | 12/2002 | Ell et al. |
| 6,539,290 | B1 | 3/2003 | Vos |
| 6,560,754 | B1 | 5/2003 | Hakewill et al. |
| 6,564,314 | B1 | 5/2003 | May et al. |
| 6,637,018 | B1 | 10/2003 | Demler |
| 6,678,818 | B1 | 1/2004 | Cofler et al. |
| 6,701,515 | B1 | 3/2004 | Wilson et al. |
| 6,732,238 | B1 | 5/2004 | Evans et al. |
| 6,760,888 | B2 | 7/2004 | Killian et al. |
| 6,763,327 | B1 | 7/2004 | Songer et al. |
| 6,862,563 | B1 | 3/2005 | Hakewill et al. |
| 6,889,313 | B1 | 5/2005 | Cofler et al. |
| 2002/0004897 | A1 | 1/2002 | Kao et al. |
| 2002/0073299 | A1 | 6/2002 | Pechanek et al. |
| 2003/0016640 | A1 | 1/2003 | Onggosanusi et al. |
| 2003/0208723 | A1 | 11/2003 | Killian et al. |

FOREIGN PATENT DOCUMENTS

| | | |
|---|---|---|
| EP | 0365188 | 4/1990 |
| EP | 0 530 918 A2 | 1/1992 |
| EP | 0 786 862 A1 | 1/1996 |
| GB | 2 308 470 | 6/1997 |
| WO | WO 97/13209 | 4/1997 |
| WO | WO 03/091914 A1 | 11/2003 |

OTHER PUBLICATIONS

Delft University of Technology Technical Report, Minimal State-Space Realization in Linear System Theory: An Overview by B. DeSchutter, Revised version—Jan. 2000, pp. 1-23.

Implementation of Digital Controllers, A Thesis Submitted to the Faculty of Purdue University by Daniel E. Viassolo, Aug. 1996, published by Simcar.com, 78 pages.

Cambell et al, "A tutorial for make", Proceedings of the 1985 ACM annual conference on the range of computing; mid-80's perspective, 1985, Denver, Colorado, United States, pp. 374-380. ISBN 0-89791-170-9.

"HDL Chip Design" by Douglas J. Smith, Ninth printing Jul. 2001, minor updates. First Printing Jun. 1996. Doone Publications. ISBN 0-9651934-3-8. pp. 1-25.

Rainer Leupers and Peter Marwedel, Retargetable Code Generation based on Structural Processor Descriptions, Design Automation for Embedded Systems, vol. 3, No. 1, Jan. 1998, pp. 1-36.

George Hadjiyiannis, Silvina Hanono, and Scrinivas Devadas, ISDL: An Instruction Set Description Language for Retargetability, 4 pages, 1997.

Vojin Zavojnovic, Stefan Pees, Christian Schleager, Markus Willems, Rainer Schoenen and Heinrich Meyr, DSP Processor/Complier Co-Design A Quantitative Approach, Integrated Systems for Signal Prcessing, Aachen University Technology, p. 761-765, 1998.

Wang et al., "Hardware/Software Instruction Set Configurability for System-on-Chip Processors," Proceedings of Design Automation Conference, 2001.

Elms, A., "Tuning a Customisable RISC Core for DSP," Electronic Product Design, Sep. 1997, vol. 18, No. 9, pp. 19-20, 22, XP000909039.

"Custom-Fit Processors: Letting Applications Define Architectures" by Josh Fisher, Paolo Faraboschi, and Giuseppe Desoli.

MDR—Microprocessor Report Article entitled "Tensilica Patents Raise Eyebrows" by Tom R. Halfhill dated Dec. 9, 2002.

Hartoog et al, "Generation of Software Tools from Processor Descriptions for Hardware/Software Codesign," ACM, Jun. 1997, pp. 303-306.

Freericks "The nML Machine Description Formalism" (Bericht 1991/15 pp. 3-41).

Fauth et al. "Describing Instruction Set Processors Using nML" (Proc. Euro. Design & Test Conf., Paris, Mar. 1995, IEEE 1995, 5 pp.).

Internet Publication http://www.retarget.com/brfchschk.html (19 pp) No date.

Internet Publication http://www.synopsys.com/products/designware/8051_ds.html (8 pp) No date.

Internet Publication http://www.synopsys.com/products/designware/dwpci_ds.html (16 pp) No date.

Internet Publication http://www.lexra.com/product.html (11 pp) No date.

Internet Publication http://www.risccores.com/html/body_aboutarc,htm (13 pp) No date.

Clucas, R., "Designing with a Customizable miscroprocessor core," Electronic Eng'g, vol. 71, No. 865, Feb. 1, 1999, p. 35.

Hogl, H., et al., "Enable ++: A General-Purpose L2 Trigger Processor," Nuclear Science Symp. & Medical Imaging Conf., vol. 2, Oct. 21-28, 1995, pp. 667-671.

Wollan, V., "A Design Methodology Achieving Fast Development Cycles for Complex VLSI Architectures," Proc. On the European Conf. on Design Automation, Feb. 22-Mar. 25, 1993, pp. 532-535.

Tensilica, Inc; Xtensa Instruction Set Architecture (ISA) Reference Manual Revision 1.0. (First 25 pages).

Tensilica, Inc. Instruction Extension Language (TIE) Reference Manual Revision 1.3.

Compton et al., "Configurable Computing: A Survey of Systems and Software," Technical Report, Northwestern University, Dept. of ECE, 1999.

Hauk et al., "The Chimaera Reconfigurable Functional Unit." Proceedings of the IEEE Symposium on Field-Programmable Custom Computing Machines, 1997.

Razdan et al., "A High-Performance Microarchitecture with Hardware-Programmable Function Units," Proceedings of MICRO-27, Nov. 1997.

Berekovic, Mladen, et al., A Core Generator for Fully Synthesizable and Highly Parameterizable RISC-Cores for System-On-Chip Designs, 1998 IEEE Workshop on Signal Processing Systems, pp. 561-568, XP-002137267.

Yang, Jin-Hyuk, et al., "MetaCore: A Configurable & Instruction-Level Extensible DSP Core," Proceedings of the ASP-DAC '98 Asian and South Pacific Design Automation Conference 1998, pp. 325-326, XP-002137268.

Warren, H.S., "Instruction Scheduling for the IBM RISC System/6000 Processor," IBM Journal of Research and Development, vol. 34, No. 1, (1990) pp. 85-92, XP000128183.

"Condition Register Coherency Look-Ahead," Research Disclosure (1993), No. 348, p. 243, XP000304185.

Ditzel, D.R., et al., "Branch Folding in the Crisp Microprocessor: Reducing Branch Delay to Zero," 14.sup.th Annual International Symposium on computer Architecture, (1987), pp. 2-8, XP000212073.

Intel Pentium Processor Family Developer's Manual—vol. 3: Architecture and Programming Manual (1995) (cover pages, 3-15 to 3-18, pp. 25-189 to 25-192).

Article entitled "The JCN Embedded Processor" by AT&T Laboratories Cambridge (modified Jun. 6, 2002, © 2001) (3 pages) (http://www.uk.research.att.com/jcn/).

AMIS feature Sheet on the Embedded RISC Microcontroller Core ARM7TDMI (no date) (2 pages) (www.amis.com).

AVAZ Product Information Sheets on Mozart2 fully synthesizable DSP core (no date) (2 pages) (http://www.avaz.com/products/cores/dspcore/mozart2/).

Intel 80386 Programmer's Reference Manual—Section 17.1 Oper-and-Size and Address-Size Attributes (no date) (1 page) (http://webster.cs.ucr.edu).

"Embedded Control Problems, Thumb, and the ARM7TDMI"; Segars et al.; 1995; IEEE: pp. 22-30.

"Xtensa: A Configurable and Extensible Processor" Gonzalez; 2000; IEEE; pp. 60-70.

"An Introduction to Thumb"; Version 2.0; Mar. 1995.

"The Microarchitecture of Pipelined and Superscalar Computers" by Amos R. Omondi, pp. 98-99.

"TriCore 1.3, Architecture Overview Handbook"; V1.3.3, May 2002.

* cited by examiner

US 7,493,470 B1

PROCESSOR APPARATUS AND METHODS OPTIMIZED FOR CONTROL APPLICATIONS

PRIORITY

This application claims priority benefit to U.S. provisional patent application Ser. No. 60/340,641 filed Dec. 7, 2001 and entitled "PROCESSOR APPARATUS AND METHODS OPTIMIZED FOR CONTROL APPLICATIONS", which is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to the field of integrated circuit design, specifically to the integration of peripheral components and macro functions with a central processing unit (CPU) or user-customizable microprocessor.

2. Description of Related Technology

Modern control theory has had a major impact on a number of industrial disciplines and applications. The need to provide cost-effective implementation of control systems becomes evident especially in high-performance electromechanical applications. Some examples can be found in industrial drives, automotive and aerospace control, where controllers are usually embedded into the system. Embedded real-time control applications, such as those targeted at linear time invariant (LTI) control, are particularly demanding since the calculations must often be performed to meet hard time deadlines.

The selection of a specific technology for a controller application is affected in part by the required speed and arithmetic factors derived for the control algorithm, resulting in a variety of different combinations of algorithms, hardware, and software. The availability of control processing solutions, which are both efficient and straightforward to use, are important elements for the achievement of robust and cost-effective solutions. Separate high-MIPS digital signal processors (DSPs) are commonly used to perform the demanding real-time calculations referenced above.

Unfortunately, when the controller is implemented using traditional such prior art architectures, the control algorithm often has to be artificially partitioned and constrained, via programming, to meet the physical bus widths and mapping on the instruction set.

Numerous instances of prior art controllers utilizing DSP or ASIC technology in the implementation of state-space control algorithms exist. For example, U.S. Pat. No. 6,490, 118 to Ell, et al. issued Dec. 3, 2002, and entitled "Adaptive h-infinity hardware controller for disc drive actuator control" discloses apparatus and methods for generating control inputs for a disc drive dual stage actuator. An h-infinity hardware controller generates the control inputs in relation to an actual position signal, a desired position signal and a unique set of coefficients. The coefficients are selected by obtaining an output response, selecting the coefficients in relation to the output response, and storing the coefficients in a nonvolatile memory location. An ASIC implementing a state-space controller functionality is also disclosed.

A number of other controller architectures and development technologies have been suggested as well. For example, U.S. Pat. No. 6,101,058 to Morris issued Aug. 8, 2000 and entitled "Method of implementing a linear discrete-time state-space servo control system on a fixed-point digital signal processor in a disc drive" discloses a method of implementing a model based servo controller in a digital signal processor in a disc drive. The method comprises obtaining matrices for a discrete-time state-space realization of the servo controller. Controller states of the controller are scaled to reduce a worst case bound on the controller states. The controller states are transformed to a desired format which reduces a number of required mathematical operations. Further, the matrices are converted to fixed point format.

U.S. Pat. No. 5,920,478 to Ekblad, et al. issued Jul. 6, 1999 entitled "Multi-input multi-output generic non-interacting controller" discloses a multi-input multi-output (MIMO) controller which is configured as a generic, non-interacting, multivariable controller with adaptive capabilities. The controller transforms the coupled multivariable control problem to multiple decoupled single-input single-output loops. The decoupling occurs in the input/output map of the system being controlled. The transformed system can then be controlled using any control synthesis technique to meet the system performance objectives, such as Proportional plus Integral plus Derivative (PID) control. An empirical dynamic model is continually identified from on-line data. From this model, static decoupling transformations based on a singular value decomposition are determined and updated and the controller gains are calculated.

U.S. Pat. No. 5,978,752 to Morris issued Nov. 2, 1999 entitled "Model validation algorithm for characterizing parameters and uncertainty in a disc drive" discloses a system and method for validating a model used in implementing a model-based servo controller in a disc drive. A nominal model is first constructed. The nominal model is augmented with an uncertainty description to characterize variations in drives to be manufactured. The model is constrained by performance objectives. Weights corresponding to the uncertainty description and performance objectives are adjusted based on a comparison between first and second matrix functions until a desired performance level is achieved while maintaining stability in a desired frequency range.

U.S. Pat. No. 5,796,920 to Hyland issued Aug. 18, 1998 entitled "Multiprocessor system and method for identification and adaptive control of dynamic systems" discloses a system and method for identifying and adapting a control system for a dynamic system. In one embodiment, massively parallel, decentralized signal processing equipment is disclosed which can (1) identify a dynamic system; (2) adapt an on-line control system for the dynamic system; and/or, (3) solve off-line complex, nonlinear problems related to either static or dynamic systems. The disclosed system optionally includes a neural network in which the neurons are two-way devices (forward and backward signal paths), each of which has a synaptic weight which is independently adjusted using only the forward and backward signals.

U.S. Pat. No. 5,796,919 to Kubica issued Aug. 18, 1998 and entitled "Method of constructing and designing fuzzy controllers" discloses a method of constructing and designing a fuzzy controller based on converting a finite dimensional linear controller to a fuzzy controller. After the fuzzy controller is created, it can be enhanced using heuristic knowledge. The fuzzy controller is constructed or designed using a microprocessor to calculate a defuzzified output based on singleton fuzzification, product inferencing and centroidal defuzzification.

U.S. Pat. No. 6,404,581 to Shah issued Jun. 11, 2002 entitled "Adaptation to unmeasured variables" discloses a scheme for management of uncertainty in control systems that require adaptation. The scheme seeks to remove as much uncertainty as possible at design time and manufacturing time by taking advantage of available compute resources in pre-computing a large set of robustness-performance tradeoff based model controllers at different operating conditions for different values of uncertainty parameters that occur in-use and in manufacturing. A group of control models, and corresponding model controllers with an uncertainty bound larger than the best-tuned controller, are generated. A subset of the model controllers is implemented in the system at manufacturing time based on characterization of the system. The subset of model controllers is switched at run time based on transient information received during operation of the system. See also United States Patent Application No. 20010014834 published Aug. 16, 2001.

U.S. Pat. No. 6,207,936 to de Waard, et al. issued Mar. 27, 2001 entitled "Model-based predictive control of thermal processing" discloses a nonlinear model-based predictive temperature control system. A multivariable temperature response is predicted using a nonlinear parameterized model of a thermal process reactor. The nonlinear parameterized model is implemented using a neural network. Predictions are made in an auto-regressive moving average fashion with a receding prediction horizon. Model predictions are incorporated into a control law for estimating the optimum future control strategy. The high-speed, predictive nature of the controller renders it advantageous in multivariable rapid thermal processing reactors where fast response and high temperature uniformity are needed.

"Designing and programming the emotion engine", Masaaki Oka, Masakazu Suzuoki, Sony Computer Entertainment, IEEE Journal, November-December 1999, discloses a home gaming system controller architecture consisting of a graphics synthesizer, "Emotion Engine," an I/O processor (IOP), and a sound-processing unit (SPU). The IOP controls peripheral devices such as a controller and a disk drive and detects controller input, which is sent to the Emotion Engine. The Emotion Engine consists of three independent processors. One is a traditional MIPS-based processor with a floating-point coprocessor, which is the overall controller. The others are floating-point vector processors. The data memory and the floating-point registers have a 128-bit width interface with the 128-bit registers divided into four 32-bit fields (x, y, z, w). Four floating-point multiply-adder-calculators (FMACs) are applied to each field respectively. The throughput of an FMAC is one clock cycle. This means the VPU can execute the following vector calculation in one cycle:

$$x3 = x0 \cdot x1 + x2$$

$$y3 = y0 \cdot y1 + y2$$

$$z3 = z0 \cdot z1 + z2$$

$$w3 = w0 \cdot w1 + w2$$

The instruction memory is 64 bits wide; one instruction consists of 32-bit upper and lower fields that execute on the same clock cycle. The upper field controls the FMACs, and the lower controls the loadstore functions as well as the divider.

As evidenced by the foregoing broad spectrum of representative approaches, prior art controller schemes are not generally optimized in a fashion which allows adaptive modification of the underlying controller platform hardware and instruction set to suit controller algorithm function or properties. Specifically, the prior art in effect approaches the problem backwards, specifying a platform (such as a floating or fixed point DSP), and then seeking to adapt the control function to the specific architecture or hardware attributes of the selected platform. The intrinsic power of the extensible or "user-configurable" RISC processor to provide the necessary adaptation to the selected controller model has to date not been harnessed.

Furthermore, these prior art solutions are typically not optimized for control applications which generally tend to have a very limited number of specific functions (e.g., state-space models), thereby necessitating additional hardware and instructions, as well as attendant increased power consumption, gate count, and die size.

Based on the foregoing, what is needed is an improved method and apparatus for implementing control algorithms (such as LTI algorithms) which meets the simultaneous goal of a significantly reduced instruction set and cycle count associated with controller operations, while also optimizing other design criteria such as gate count and power consumption. Such improved method and apparatus would allow the controller designer to select the control functionality or algorithm best adapted for the application(s) at hand, and then easily tailor a cycle-, silicon-, and power-efficient processor solution which is optimized for that particular control algorithm. These capabilities would enable the designer to readily model real-time control algorithms, as well as other types of applications, without the need for a separate DSP or floating point unit.

SUMMARY OF THE INVENTION

In a first aspect of the invention, an improved method of controlling a system using a digital processor is disclosed. The method generally comprises providing a user-configurable processor core having at least one extended instruction in the instruction set, the instruction(s) being adapted to perform real-time computation and control of the system; generating control signals using the extended processor; and controlling the system using the generated signals. In one exemplary embodiment, the processor comprises a 32-bit RISC processor, the at least one instruction comprises multiply and multiply-accumulate instructions (CMUL and CMAC), and the system comprises a linear time invariant (LTI) application.

In a second aspect of the invention, an improved controller apparatus is disclosed. The apparatus generally comprises: a pipelined digital processor core having a base instruction set and at least one extension instruction adapted to run on said core, the at least one extension instruction being optimized for real-time control applications; extension hardware operatively coupled to the pipeline of the core, the extension hardware facilitating the running of the at least one extension instruction; and at least one algorithm adapted to run on the core and to provide an output useful for real-time control applications based on at least one input and a plurality of state variables, the algorithm utilizing the at least one extension instruction to optimize the controller operation. In one exemplary embodiment, the algorithm is adapted for LTI applications. It utilizes a state-space approach, and comprises (i) a first set of mathematical equations relating state variables to the input signal(s); and (ii) a second set of mathematical equations relating the state variables and the current input to the output signal. The controller formulation is based upon the 4 operator. The equations used in the algorithm for providing the real-time implementation firstly calculate the output, and then an update of the states ready for the next sample.

A variable ($x_{temp}$) is used to store the sum of the prior values of the equation variables thereby advantageously avoiding having to retain old values for the states while the new values are calculated. Rather, the state variables are simply overwritten at each calculation.

In a third aspect of the invention, an improved digital processor core is disclosed. The core generally comprises a pipelined core with base and extension instructions, and at least one extension instruction adapted for real-time control applications. In one embodiment, the processor comprises a 32-bit RISC core having extended multiply and multiply-accumulate instructions (CMUL and CMAC) adapted particularly for linear time invariant (LTI) applications. Additional pipeline hardware including extension registers and an extension arithmetic logic unit is provided in the core to support the CMUL and CMAC instructions. The CMUL and CMAC instructions allow the core to execute the control algorithm in a reduced number of clock cycles, thereby facilitating real-time control with minimal hardware requirements. This is particularly advantageous for embedded applications.

In a fourth aspect of the invention, a system adapted for real-time control and utilizing the aforementioned digital processor is described. The system generally comprises the extended digital processor with extension instructions and supporting hardware; the control algorithm (disposed within the processor program memory or associated storage device in the form of code); and a device operatively coupled to the output of the processor which is controlled at least in part by the algorithm output. In one exemplary embodiment, the processor includes CMAC and CMUL extension instructions adapted for real-time iterative control of an LTI device used in an industrial application.

In a fifth aspect of the invention, an improved state variable and coefficient format for use with the extensions (and processor) previously described herein are disclosed. In one exemplary embodiment, a 32-bit fixed-point format is used to represent the internal variables, with the input values brought in as signed integer, a small allowance for overflow, and fractional bits for underflow. The position of the binary point is chosen so the input/output values map directly into this internal variable format. This format is also used to store the partial products and temporal values required by algorithm. The coefficients are held in a simple low-precision floating-point form, with a mantissa portion and an exponent portion. The position of the binary point in the mantissa portion is predetermined to allow for fractional values. The adoption of these particular formats in the present invention offers a significant reduction in computation time, specifically by avoiding the need for complex operations using standard floating-point formats.

In a sixth aspect of the invention, an improved method of generating an optimized controller design is disclosed. The method generally comprises: providing a processor core being adapted for user-configuration, the user configuration comprising at least the specification of at least one extension instruction to be added to the core instruction set; representing a controller in a particular description; and configuring the processor core by specifying the at least one extension instruction based at least in part on the controller description. In one exemplary embodiment, the processor core comprises a 32-bit RISC core, the extension instructions the aforementioned CMUL/CMAC instructions adapted for LTI, and the act of fabricating comprises fabricating an IC using a sub-micron process.

DETAILED DESCRIPTION

Figure 1:
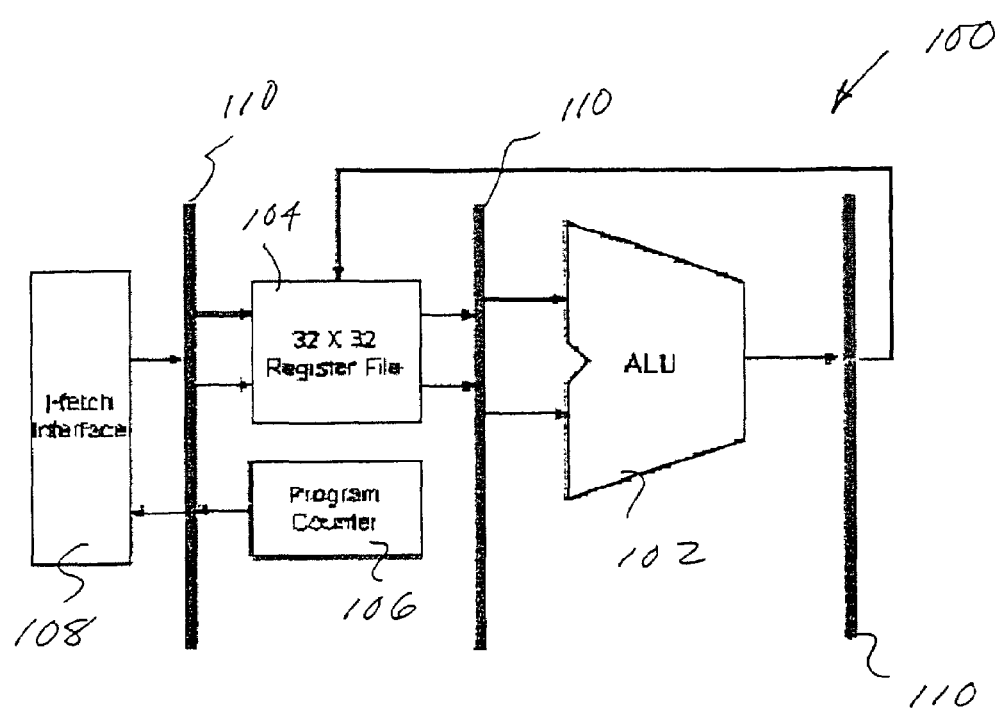
FIG. 1 is functional block diagram illustrating one exemplary architecture of a prior art digital processor core utilized in conjunction with the present invention.

Reference is now made to the drawings wherein like numerals refer to like parts throughout.

As used herein, the term "processor" is meant to include any integrated circuit or other electronic device (or collection of devices) capable of performing an operation on at least one instruction word including, without limitation, reduced instruction set core (RISC) processors such as the ARCtangent™ user-configurable core manufactured by the Assignee hereof (described subsequently herein), central processing units (CPUs), and digital signal processors (DSPs). The hardware of such devices and any other ancillary hardware may be integrated onto a single substrate (e.g., silicon "die"), such as in SoC devices, or distributed among two or more substrates. Furthermore, various functional aspects of the processor may be implemented solely as software or firmware associated with the processor.

Additionally, it will be recognized by those of ordinary skill in the art that the term "stage" as used herein refers to various successive stages within a pipelined processor; i.e., stage 1 refers to the first pipelined stage, stage 2 to the second pipelined stage, and so forth. Such stages may comprise, for example, instruction fetch, decode, execution, and writeback stages.

As used herein, the term "real-time" is meant to include both real and substantially real-time applications, the latter recognizing that there is inherent latency associated with any control system.

As used herein, the term "extension" is meant to broadly refer to any instruction, hardware, or other device which does not exclusively form part of the "base case" core instruction set or architecture, and is in no way limited to the specific instructions or hardware explicitly described herein.

Lastly, any references to hardware description language (HDL) or VHSIC HDL (VHDL) contained herein are also meant to include other hardware description languages such as Verilog®. Furthermore, an exemplary Synopsys® synthesis engine such as the Design Compiler 2000.05 (DC00) may be used to synthesize the various embodiments set forth herein, or alternatively other synthesis engines such as Buildgates® available from, inter alia, Cadence Design Systems, Inc., may be used. IEEE std. 1076.3-1997, IEEE Standard VHDL Synthesis Packages, describes an industry-accepted language for specifying a Hardware Definition Language-based design and the synthesis capabilities that may be expected to be available to one of ordinary skill in the art.

Overview

As previously discussed, prior art controller implementations impose sometimes artificial restrictions on the control algorithm used with the controller. A more efficient approach would require changing the architecture to better suit the algorithm. User-configurable processors (such as the ARCtangent processor manufactured by the Assignee hereof), with a particular combination of registers, logic elements and interconnections, opens the possibility of achieving in one clock cycle what traditional processors require tens or even hundreds of clock cycles to accomplish. This allows the implementation of complex high sample rate controllers with relatively little effort.

Accordingly, the present invention comprises apparatus and methods (including an algorithm and corresponding extensions) for a configurable processor architecture that support the implementation of high-performance controllers such as the aforementioned linear time invariant (LTI) devices. The overall approach of the invention involves reformulating the aforementioned controller into a particular discrete state-space representation, which is optimized for numerical efficiency (such as by using the well known δ operator). In conjunction, custom extensions are designed and integrated into a digital processor (e.g., user-customizable 32-bit ARCtangent RISC processor) to support the algorithm. Such design and integration is conducted using, for example, the methods and apparatus described in Assignee's co-pending U.S. patent application Ser. No. 09/418,663 filed Oct. 14, 1999 and entitled "Method and Apparatus for Managing the Configuration and Functionality of a Semi-Conductor Design", now U.S. Pat. No. 6,862,563, which is incorporated herein by reference in its entirety. The format disclosed herein used to represent the coefficients and state variables of the controller are specially suited to meet the requirements of linear time invariant control.

Description of Exemplary ARCtangent Processor

The ARCtangent A4 processor is a user-customizable 32-bit RISC core for ASIC, system-on-chip (SoC), and FPGA integration. It is synthesizable, configurable, and extendable, thus allowing developers to modify and extend the architecture to better suit specific applications. The ARCtangent microprocessor comprises a 32-bit RISC architecture with a four-stage execution pipeline. The instruction set, register file, condition codes, caches, buses, and other architectural features are user-configurable and extendable. It has a 32×32-bit core register file, which can be doubled if required by the application. Additionally, it is possible to use large number of auxiliary registers (up to 2E32). FIG. 1 graphically illustrates the functional elements of the core 100 of this processor, including the arithmetic logic unit (ALU) 102, register file (e.g., 32×32) 104, program counter (PC) 106, instruction fetch (i-fetch) interface logic 108, and various stage latches 110.

Figure 1A:
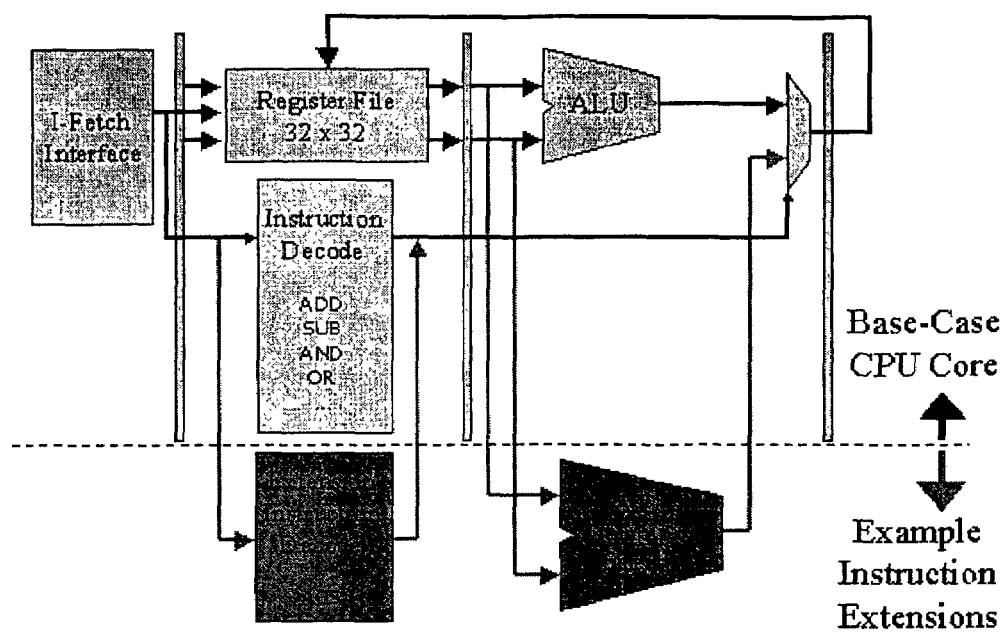
FIG. 1a is a graphic illustration of the prior art process of adding extension instructions and hardware to a processor core.

The processor's instruction set consists of 30 instructions, 16 base-case instructions plus 14 variations (See Appendix I). It includes arithmetic/logic, load/store, and branch/jump instructions. If required, it is advantageously possible to define up to 16 additional dual-operand and 54 additional single-operand instructions for custom applications. FIG. 1a graphically illustrates the process of adding extension instructions to the core. Extension instructions enjoy all the rights and privileges of standard instructions, including register access and conditional execution.

The ARCtangent-A5 processor is a 32-bit four stage pipeline RISC architecture that implements the ARCompact™ instruction set. The ARCompact ISA is described in detail in co-owned, co-pending U.S. provisional patent application No. 60/353,647 filed Jan. 31, 2002 and entitled "Configurable Data Processor With Multi-Length Instruction Set Architecture" which is incorporated herein by reference in its entirety. ARCompaCt™ is an instruction set architecture (ISA) that allows designers to mix 16 and 32-bit instructions on its 32-bit user-configurable processor. The key benefit of the ISA is the ability to cut memory requirements on a SoC (system-on-chip) by significant percentages, resulting in lower power consumption and lower cost devices in deeply embedded applications such as wireless communications and high volume consumer electronics products.

The main features of the ARCompact ISA include 32-bit instructions aimed at providing better code density, a set of 16-bit instructions for the most commonly used operations, and freeform mixing of 16- and 32-bit instructions without a mode switch—significant because it reduces the complexity of compiler usage compared to competing diode—switching architectures. The ARCompact instruction set expands the number of custom extension instructions that users can add to the base-case ARCtangent™ processor instruction set. The A4 processor architecture allows users to add as many as 69 new instructions to speed up critical routines and algorithms. With the ARCompact ISA, users can add as many as 256 new instructions. Users can also add new core registers, auxiliary registers, and condition codes. The ARCompact ISA thus maintains and expands the user-customizable features of ARC's configurable processor technology.

As 32-bit architectures become more widely used in deeply embedded systems, code density can have a direct impact on system cost. Typically, a very high percentage of the silicon area of a system-on-chip (SoC) is taken up by memory.

The ARCompact ISA delivers high density code helping to significantly reduce the memory required for the embedded application, an important factor for high-volume consumer applications, such as flash memory cards. In addition, by fitting code into a smaller memory area, the processor potentially has to make fewer memory accesses. This can cut power consumption and extend battery life for portable devices such as MP3 players, digital cameras and wireless handsets. Additionally, the new, shorter instructions can improve system throughput by executing in a single clock cycle some operations previously requiring two or more instructions. This can boost application performance without having to run the processor at higher clock frequencies.

The support for freeform use of 16- and 32-bit instructions advantageously allows compilers and programmers to use the most suitable instructions for a given task, without any need for specific code partitioning or system mode management. Direct replacement of 32-bit instructions with new 16-bit instructions provides an immediate code density benefit, which can be realized at an individual instruction level throughout the application. As the compiler is not required to restructure the code, greater scope for optimizations is provided, over a larger range of instructions. Application debugging is also more intuitive because the newly generated code follows the structure of the original source code.

DSP extensions may be added to the ARCtangent core(s) directly using the ARChitect™ software environment manufactured by the Assignee hereof, or similar configuration tool. Options include for example 16×16-bit, 24×24-bit, or dual 16×16-bit multiply-accumulate (MAC) instructions; 32-bit signed saturating ADD/SUB instructions; and up to four banks of configurable XY memory for DSP data. The ARCtangent DSP extensions support single-cycle parallel data moves, modulo and bit-reverse addressing, variable-offset pre- and post-increment addressing modes, and zero-overhead loops and branches. An optimized DSP function library of common filters and algorithms is available for use with the core.

It will be recognized that while the following discussion of the various aspects of the invention (and specific embodiments) is cast primarily in terms of the ARCtangent A4 and A5 cores, such discussion is merely illustrative; the various aspects may be readily adapted for use with other processor types and configurations.

Control Algorithm

In one exemplary embodiment, a state-space approach is adopted for representing the controller. As is generally known, the state-space approach is a unified method for modeling, analyzing, and designing a wide range of systems. This representation of the system involves a relationship between the input and output signals, it also involves an additional set of variables, called state variables that provide information about state of the system. The mathematical equations describing the system, its input, and its outputs are usually divided in two parts: (i) a first set of mathematical equations relating the state variables to the input signal; and (ii) a second set of mathematical equations relating the state variables and the current input to the output signal.

An Nth-order linear time-invariant system with $\alpha$ inputs and $\beta$ outputs can be described by the next state and output equations as follows:

$$X(k+1)=AX(k)+BU(k)$$

$$Y(k)=CX(k)+DU(k)$$

where k represents the k-th sample instant, $X(k)$ is a N-dimensional state vector, $Y(k)$ is a $\beta$-dimensional output vector, $U(k)$ is a $\alpha$-dimensional input vector, and A, B, C and D are $N \times N$, $N \times \alpha$, $\beta \times N$, and $\beta \times \alpha$ real coefficient matrices that describe the controller's behavior. In the present embodiment, a controller formulation based upon the $\zeta$ operator such as that described in "*Digital control: Fundamentals, theory and practice*," W. Forsythe and R. M. Goodall McGraw-Hill, 1991, the relevant portions of which are incorporated herein by reference in their entirety. It will be appreciated, however, that other operators may be used (or even used in conjunction with the $\zeta$ operator) consistent with the invention.

Figure 2:
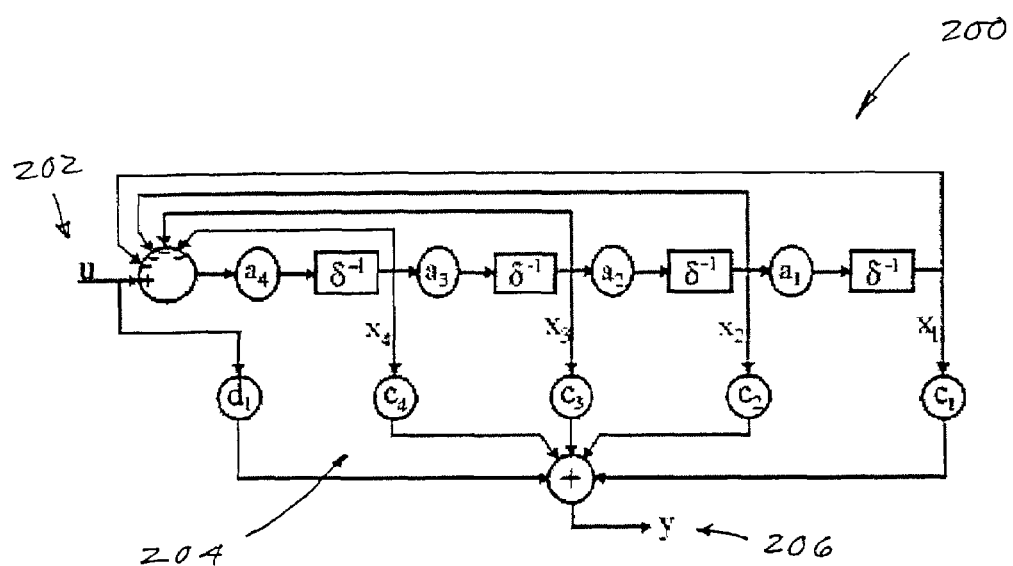
FIG. 2 is a functional representation of a controller of the type used with the present invention.

As an illustrative example of the foregoing, consider a general-purpose single-input single-output 4th order controller 200. FIG. 2 is a diagrammatic representation of an exemplary controller 200, showing input 202, control logic 204, and output 206. The actual equations used for real-time implementation in the illustrated embodiment are as provided below; firstly the calculation of the output, then an update of the states ready for the next sample:

$$y=c_1x_1+c_2x_2+c_3x_3+c_4x_4+d_1u$$

$$x_1=x_1-a_1x_{temp}+a_1u$$

$$x_2=x_2+a_2x_1$$

$$x_3=x_3+a_3x_2$$

$$x_4=x_4+a_4x_3$$

$$x_{temp}=x_1+x_2+x_3+x_4$$

Note that $X_{temp}$ is used to store the sum of the old (i.e., prior) values of $x_1$ to $x_4$, thereby advantageously avoiding having to retain old values for the states while the new values are calculated. Rather, the state variables of the present invention are simply overwritten at each calculation. The following exemplary "C" language program implements this controller:

```
void controller( )
{
    while(true)
    {
        U = read_input( );
        Y = C1*X1 + C2*X2 + C3*X3 + C4*X4 + D*U;
        X1 = X1 - A1*XT + A1*U;
        X2 = X2 + A2*X1;
        X3 = X3 + A3*X2;
        X4 = X4 + A4*X3;
        XT = X1 + X2 + X3 + X4;
        write_output(Y);
    }
}
```

© 2000-2002 ARC International. All rights reserved.

This program performs iterative calculations within a loop. The first action is to read a new input sample, then the output value for the current sampling period is calculated and the output function transfers this value to the appropriate output. Finally, the internal variables are updated and partial product obtained so the algorithm is ready to process the next input sample.

Controller Characteristics

A number of properties of the control algorithm that facilitate its implementation can be identified: (i) it is an iterative process that performs computation on a continuous (or near continuous) stream of input data; (ii) a set of inputs in used to produce an output within each sample period; (iii) data dependant operations are not needed; (iv) the algorithm loop can be (and typically is) executed indefinitely; (v) the deadline to perform the operations is determined by the sampling period; and (vi) the coefficients values do not vary as a function of time. The controller formulation is based upon the $\delta$ operator. The use of this formulation presents several advantages when compared against the traditional z operator, including: (i) no overflow of internal variables; (ii) numerical stability; (iii) reduced dynamic range of controller states (allow the use of fixed-point variables to represent the internal variables); and (iv) custom simplified representations of coefficients and state variables can be used, thereby avoiding the need for complex operations using standard floating-point formats.

Data Format

The accuracy used to represent the values of coefficient and state variables affects directly the frequency response of the controller and plays a significant role in determining the cost of implementation. Although word lengths can be chosen arbitrarily large to support a wide range of applications, it is important to keep it as short as possible since it impacts the amount of hardware resources required. This is particularly true on the approach of the present invention because the calculations are typically performed by dedicated logic added to the processor. However, it should be recognized that other alternatives may be utilized; the present invention is not necessarily constrained to use with such dedicated logic.

State Variables Format

The overall bit resolution required to represent the internal state variables is determined by the number of bits used to sample input data and the number of bits required to handle internal underflow and overflow. The number of bits per sample is determined by the configuration of the analogue-digital and digital-analogue conversion hardware used, which for control applications is usually 12 bits or there about. The number of underflow bits can be derived from the structure in terms of coefficients and the required fractional output accuracy for small inputs. The number of overflow bits required can be determined from the maximum overall gain that is likely to be seen in the target applications for the device. Evaluation of the needed underflow/overflow bits is readily performed by one of ordinary skill in the arts, and accordingly is not described further herein.

Figure 3:
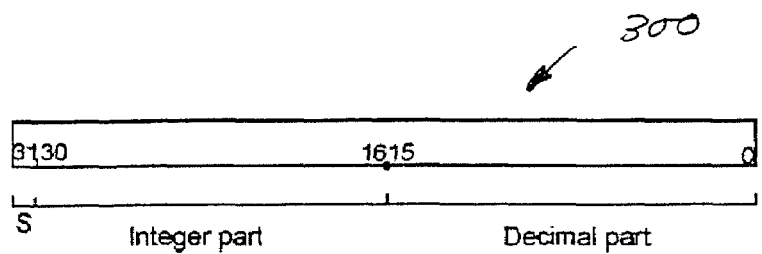
FIG. 3 is a graphical representation of an exemplary internal variable format used with the processor of FIG. 1.

A 32-bit fixed-point format 300 is used in the illustrated exemplary embodiment to represent the internal variables (see FIG. 3), with the input values brought in as signed integer, a small allowance for overflow, and fractional bits for underflow. The position of the binary point is chosen so the input/output values map directly into the internal variable format 300. This format is also used to store the partial products and temporal values required by algorithm.

Figure 4:
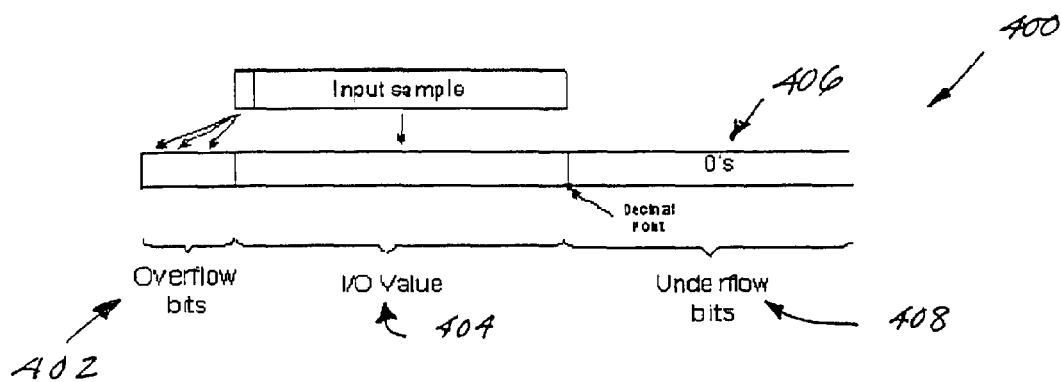
FIG. 4 is a graphical representation illustrating mapping of the input/output (I/O) values into the variable format of FIG. 3.

Input sample values must be mapped to fit within the state variable format. As both types of variables are represented using two's complement format, the mapping is quite straightforward. As shown in FIG. 4, the overflow bits 402 are a sign extension of the input value 404 and 0's 406 are inserted in the underflow part 408 to complete the 32-bit wide state variable word 400. To extract an output value from the state variable format of the illustrated embodiment, the 12 least significant bits of the integer part must be extracted.

Coefficients Format

Figure 5:
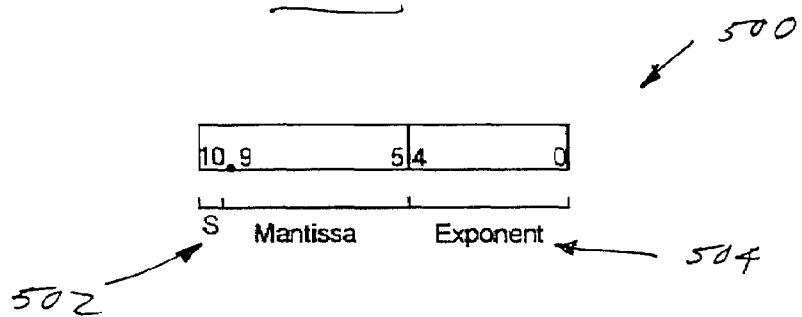
FIG. 5 is a graphical representation of an exemplary coefficient format (including mantissa and exponent) used with the processor of FIG. 1.

In the exemplary embodiment, the coefficients are held in a simple low-precision floating-point form 500, with a mantissa part 502 and an exponent part 504 (FIG. 5). In this case, the position of the binary point in the mantissa is predetermined to allow for fractional values. A 6-bit mantissa supports most control applications. Of course, if there are exceptional requirements, it is always possible to extend the hardware precision as required while maintaining the essential principles. The exponent is in the present embodiment stored in a biased format to allow exponents in the range of −25 (000002) to +6 (111112) to be stored, although other ranges may clearly be used.

The adoption of these particular formats in the present invention offers a significant reduction in computation time, specifically by avoiding the need for complex operations using standard floating-point formats.

Data Path Requirements

Figure 6:
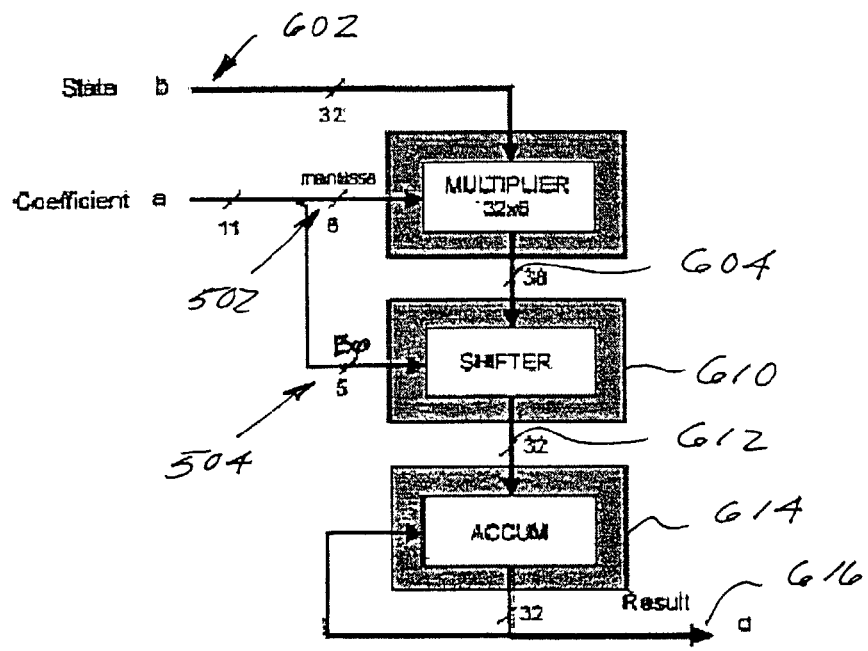
FIG. 6 is a functional block diagram illustrating one exemplary embodiment of the apparatus adapted to perform the multiply-accumulate (MAC) operations for sum-of-products calculations according to the present invention.

To execute the sum-of-products operation(s) required by the previously described algorithm, multiply-and-accumulate (MAC) operations are required. A MAC operation has the following exemplary form:

$$d = a*b + accum$$

where 'a' is a coefficient and 'b', 'accum' and 'd' are state variables. FIG. 6 illustrates the hardware required for such MAC operations. First, the coefficient has to be divided into its mantissa 502 and exponent 504 parts. The 6-bit mantissa 502 is multiplied by the 32-bit state variable b 602, the 38-bit result 604 is then shifted by the shifter 610 according the exponent value 504 to complete the multiplication operation. Finally, the result 612 of the multiplication, which is in state variable format, is truncated to 32 bits and added to the value held by the accumulator 614 to complete the MAC operation and produce the result d 616.

Thus, the hardware components required to perform the MAC operation in the present invention are: (i) 32×6-bit signed multiplier; (ii) 38-bit barrel shifter (+6, −25); and (iii) 32-bit adder/accumulator. The construction of each of these components is well understood in the data processor arts, and accordingly is not described further herein. It will also be recognized that the sizes (bits) associated with each of the foregoing components may be varied consistent with the overall hardware configuration in use; the values described herein are merely illustrative of the broader concepts.

Data Storage Requirements

The ARCtangent processor previously described herein provides several possible locations where the variables required to perform the aforementioned algorithm can be stored. These include the processor's main memory, core registers, extended core registers, auxiliary registers, or XY memory (not shown). Ideally, the processor will not be idle waiting for data at any given time. Thus, the simplest approach to optimize access speed is to store all the required data in the core registers; however, for large controllers, this can restrict the number of registers available for the processor, since many core registers will be occupied with data relating to the controller. The number of coefficients, state variables and temporal values required to implement the algorithm is determined by the complexity of the controller. Tables 1 and 2 herein show the number of values in coefficient and state variable format required. The values in the tables are expressed in terms of the order controller (N), number of inputs (α) and number of outputs (β).

TABLE 1

Number of values in coefficient format.

|  | Number of values |
| --- | --- |
| A and B Matrices | N |
| C Matrix | βN |
| D Matrix | βα |
| Total: | N + βN + βα |

TABLE 2

Number of values in state variable format.

| | Number of values |
|---|---|
| State variables | N |
| Input samples | α |
| Output values | β |
| Xtemp value | 1 |
| Total: | N + α + β + 1 |

As an example, consider a modest 4th order single-input single-output controller. This controller requires storing a total of 9 coefficients and 7 state variables, whereas a more complex 13th order controller with 3 inputs and 1 output would require storing a total of 55 coefficients and 18 state variables.

Extension Instructions

To implement the control algorithm using the custom data formats previously described herein, two multi-operand instructions are added to the processor's instruction set: (i) CMUL and (ii) CMAC. It will be recognized that while the foregoing instructions are each three-operand formats, instructions with other numbers of operands may conceivably be utilized consistent with the invention.

Figure 7:
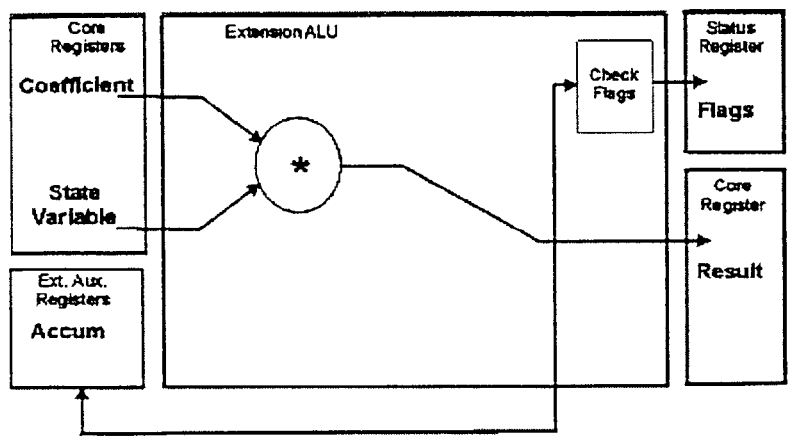
FIG. 7 is a logical block diagram illustrating the functionality of an exemplary embodiment of the core multiply (CMUL) instruction of the present invention.

(i) CMUL instruction. The CMUL instruction performs a signed multiplication of a coefficient by a state variable. The signed result is placed in the destination register and in the accumulator. If no destination register is defined, the signed result is only placed in the accumulator. The implementation of the CMUL instruction is shown in FIG. 7. A coefficient and a state variable are read from the core registers, then they are multiplied in the extension ALU and the result is written to the accumulator and, if indicated by the instruction, to a core register. See Appendix II.

Figure 8:
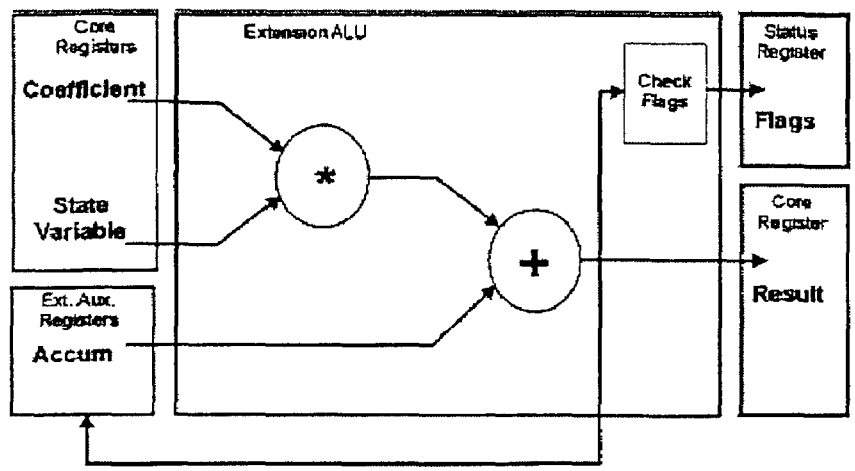
FIG. 8 is a logical block diagram illustrating the functionality of an exemplary embodiment of the core multiply-accumulate (CMAC) instruction of the present invention.

(ii) CMAC instruction. The CMAC instruction performs a signed multiplication of a coefficient by a state variable and adds the result to the value held by the accumulator. If a destination field is specified, the signed result is placed in the destination register. The implementation of the CMAC instruction is shown in FIG. 8. A coefficient and an internal variable are read from the core registers, then they are multiplied in the extension ALU and the result of the multiplication is added to the value held in the accumulator. The result of the MAC operation is then written back to the accumulator and, if indicated by the instruction, to a core register. See Appendix III.

For both instructions, the appropriate flags are set according to the result of the operation, and the values written back to the 32-bit core registers are rounded and saturation limited.

Extensions and the Pipeline

Figure 9:
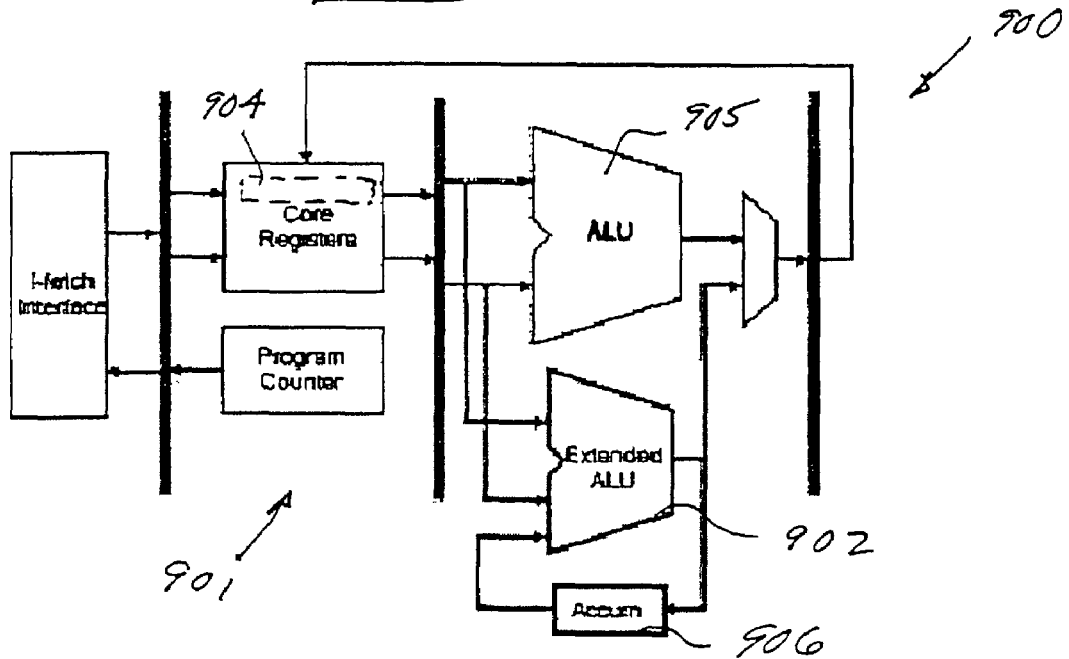
FIG. 9 is functional block diagram illustrating one exemplary embodiment of a pipelined digital processor core incorporating the aforementioned extensions of the present invention.
Figure 9A:
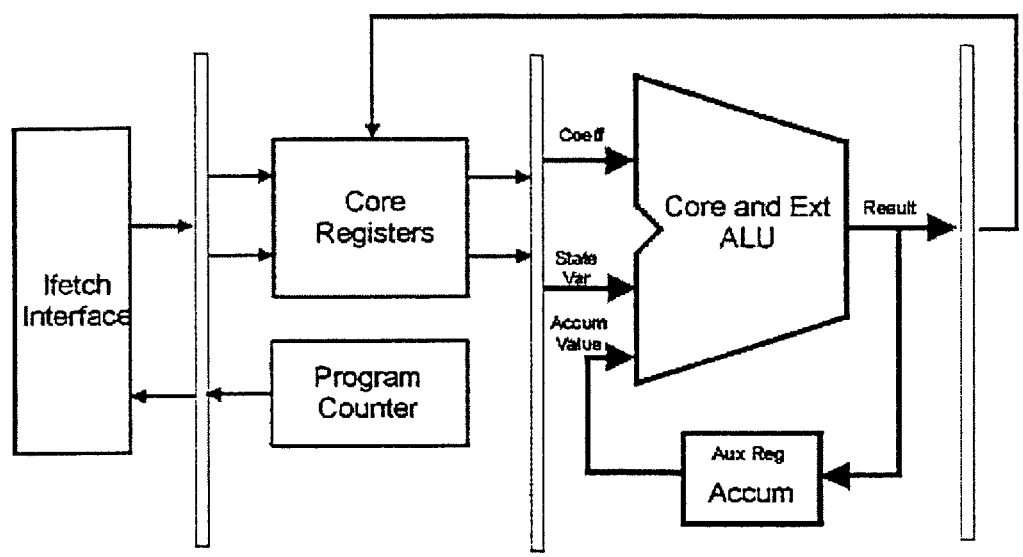
FIG. 9a is functional block diagram illustrating a second embodiment of a pipelined digital processor core incorporating the aforementioned extensions of the present invention.

The CMUL AND CMAC extensions are mapped into the pipeline 901 of the processor 900 (e.g., ARCtangent A4 or A5) as shown in FIG. 9. The operations are implemented in the extended ALU 902 and the accumulator value is stored in an extended auxiliary register 904. This block diagram illustrates how the custom extensions become an integral part of the core. The original architecture (FIG. 1 herein) was modified through, inter alia, the addition of the extension ALU 902 and accumulator 906. The extended ALU 902 performs the CMUL and CMAC operations and the accumulated value is held in the accumulator 906. FIG. 9a shows an alternate embodiment of the processor pipeline adapted for the CMUL and CMAC extensions.

The approximated gate count for the embodiment of the processor 900 of FIG. 9 including the custom extension(s) is 14500 (8444 for the base core configuration of the processor plus 6056 for the CMUL and CMAC extensions and associated hardware). 1024 bits of SRAM are required for the core registers. The clock speed is 200 MHz for a typical 0.18 μm technology. These figures may vary depending the processor configuration and on the characteristics of a particular technology, operating parameters, and synthesis constraints.

For example, the present invention is compatible with 0.35, 0.18, and 0.1 micron processes, and ultimately may be applied to processes of even smaller or other resolution. An exemplary process for fabrication of the device is the 0.1 micron "Blue Logic" Cu-11 process offered by International Business Machines Corporation, although others may be used.

It will be appreciated by one skilled in the art that the processor of FIG. 9 may also contain any commonly available peripheral such as serial communications devices, parallel ports, timers, counters, high current drivers, analog to digital (A/D) converters, digital to analog converters (D/A), interrupt processors, LCD drivers, memories and other similar devices. Further, the processor may also include other custom or application specific circuitry, such as to form a system on a chip (SoC) device useful for providing a number of different functionalities in a single package. The present invention is not limited to the type, number or complexity of peripherals and other circuitry that may be combined using the method and apparatus. Rather, any limitations are primarily imposed by the physical capacity of the extant semiconductor processes which improve over time. Therefore it is anticipated that the complexity and degree of integration possible employing the present invention will further increase as semiconductor processes improve.

Implementing the Operations

As an example of the implementation of the apparatus and methodology of the present invention, consider the following operation (similar to those previously described herein):

$$X1 = X1 + A1*XT + A1*U$$

Where X1, A1, XT, and U are operands. It is assumed that the operands are contained in the following core registers:

reg1=X1
    reg2=A1
    reg3=XT
    reg4=U
    reg10=1

The assembly language instructions required to implement the operations for this example are as follows:

cmul 0, r1, r10 ; accum = X1
    cmac 0, r2, r3 ; accum = accum + ( −A1*XT)
    cmac r1, r2, r4 ; X1 = accum = accum + ( −A1*XT)
    © 2000-2002 ARC International. All rights reserved.

It is clear that the custom MAC extensions (CMUL, CMAC) are especially well suited to implement the computational-intensive calculation required to implement real-time digital control, thereby reducing the cycle count needed to perform these computations.

Performance Results

The features offered by processors such as the ARCtangent allow several configurations that can be used to implement the control algorithm of the present invention. As an illustration of the inherent benefits of the present invention, two operations extracted from the exemplary controller 200 previously described herein (FIG. 2) were implemented and simulated using CASSEIA (Cycle-Accurate Signal Simulator with Extensible Instruction Architecture). CASSEIA is a development and verification tool for the ARCtangent that offers both functional verification and cycle-accurate timing analysis at higher speeds than a typical hardware description language (HDL) simulator. Appendices IV and V hereto provided exemplary detailed information regarding the coding and test results produced by CASSIEA in the context of the present invention.

It will be recognized that while the discussion included herein is cast in terms of CASSEIA, other software tools (or combinations thereof) may be used. For example, the Instruction Set Simulator (ISS) provided by MetaWare Software Inc., the ARC ARCangel™ FPGA-based development system, or tools from other manufacturers may be used depending on the application. The following discussion is therefore merely exemplary in nature. See Appendix VI hereto, describing an exemplary CSP library implementation for the MetaWare ISS system.

The following two operations, similar to those that implement the controller example previously described herein, were implemented and simulated using CASSEIA:

Line 1: X1 = X1 + A1*XT + A1*U;
Line 2: Y = C1*X1 + C2*X2 + C3*X3 + C4*X4 + D*U

The following processor configurations were implemented:

1. Base case instruction set plus 32×32-bit multiplier extension. This extension multiplier combined with the base case 'add' instruction provides a simple solution to implement matrix multiplication. The result of multiplying two values can be added to a previously calculated value using the add instruction. Thus, two instructions are required to complete a MAC operation. Two versions of the 32×32-bit multiplier are available, 'fast' and 'small', taking four and ten cycles respectively. Both version of the multiplier were implemented and tested as described in the Appendices.

2. Base case instruction set plus DSP extensions. These DSP extensions comprise a configurable MAC block with 16×16-bit, dual 16×16-bit and 24×24-bit MAC instructions, 32-bit signed saturating add and subtract instructions, and XY memory. These extensions are better suited to implement the control algorithm because they include combination of multipliers and accumulators that are able to perform a MAC operation with a single instruction. For this study, the 24×24-bit MAC extension was used.

3. Base case instruction set plus custom (CSP) extensions. Custom extensions allow the addition of logic to the ALU to support MAC operations that use the coefficient and internal variable formats of the present invention as previously described herein. The results of the MAC operations are stored using extension auxiliary registers. The use of simplified custom formats allows the core to execute a MAC operation is a single clock cycle.

Figure 10:
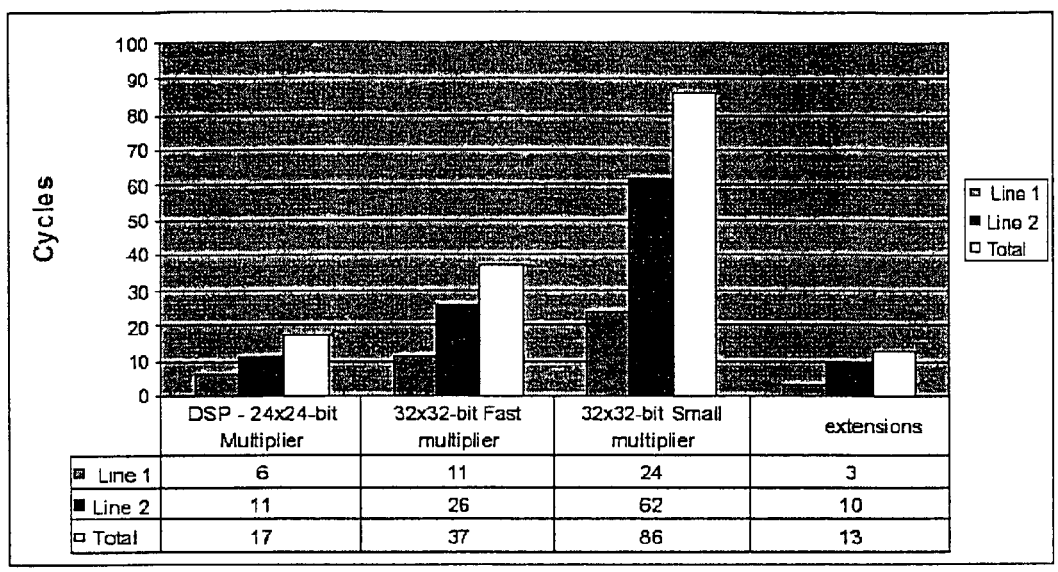
FIG. 10 is a graphical representation of the results (i.e., number of cycles required) obtained when implementing the methodologies of the present invention as compared to various prior art configurations.

FIG. 10 illustrates the number of cycles required by each processor configuration to perform both operations listed above. The results show that the number of cycles required to perform the calculations when the CSP extensions (i.e., CMUL and CMAC) are used is similar to the number required when the DSP extensions are used. However, the use of the CSP extensions offers the advantage of exploiting the superior numerical characteristics of the algorithm.

When the 32×32-bit multiplier is used (case 1, above), the processor must wait until the result of every multiplication is available to perform the subsequent addition operation. This explains the large number of cycles required to perform the calculation even when the 'fast' version of the multiplier was used.

It is noted that yet a simpler solution is to implement the controller using only the base case instruction set. In this case, the number of instructions required to complete a MAC operation is large because the instruction set does not include a multiply instruction. While the emphasis of the present invention is on high-speed computation, it will be appreciated that when high-speed computation is not a requirement, the basic configuration (i.e., base case instruction set only) may offer some advantages in terms of power consumption, silicon area and cost.

In sum, the custom extension apparatus and methodology described herein provides for efficient implementation of high-performance embedded real-time control. The use of custom extensions eliminates the need for a separate DSP or complex coprocessor, as is common in the prior art. The invention offers solutions to satisfy the demands of complex systems where a number of different functions are required, based on the premise that the architecture is adapted fit the required algorithm and not vice versa. In this fashion, the resultant processor architecture is truly adaptive to its required function.

The state-space models of control systems were identified by the Assignee hereof as specially suited to implementations using computer solutions because the number of functions that are required is both quite limited and specific. This integrated approach provides a complete solution where the custom extensions perform the computationally demanding operations, and the general-purpose instruction set of the processor is used to perform the additional functions needed to implement real-time control. Advantageously, this approach can be easily extended to handle most, if not all, applications where high-speed digital filtering is needed.

It will be appreciated by one skilled in the art that the integrated circuit device of FIG. 9 or 9a may also contain any commonly available peripheral such as serial communications devices, parallel ports, timers, counters, high current drivers, analog to digital (A/D) converters, digital to analog converters (D/A), interrupt processors, LCD drivers, ROM, and other similar devices. Further, the processor may also include other custom or application specific circuitry. The present invention is not limited to the type, number or complexity of peripherals and other circuitry that may be combined using the method and apparatus. Rather, any limitations are imposed by the physical capacity of the extant semiconductor processes which improve over time. Therefore it is anticipated that the complexity and degree of integration possible employing the present invention will further increase as semiconductor processes It will be recognized that while certain aspects of the invention have been described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

We claim:

1. An apparatus comprising:
a user-configured and extended digital processor core having a pipeline, comprising: a base instruction set, said set comprising a plurality of instructions adapted to run on said core;
at least one extension instruction adapted to run on said core, said at least one extension instruction being user-designated, and optimized for real-time control applications; and
extension hardware operatively coupled to said pipeline of said core, said extension hardware facilitating the running of said at least one extension instruction by said core;
a storage device in data communication with said processor core; and
at least one algorithm disposed at least partly in said storage device, said at least one algorithm being adapted to provide an output useful for real-time control applications based on at least one input and a plurality of state variables, said algorithm utilizing said at least one extension instruction to optimize the operation thereof;
wherein said base instruction set comprises:
a plurality of first instructions having a first length;
a plurality of second instructions having a second length; and
wherein said processor core further comprises logic adapted to decode and process both said first length and second length instructions from a single program having both first and second length instructions contained therein, wherein said first length is less than said second length; and
said first instructions occur more frequently within said single program than said second instructions.

2. The apparatus of claim 1, wherein said algorithm is adapted to perform iterative calculations within a loop, said act of performing iterative calculations performed according to the method, comprising:
reading a new input sample;
calculating the output value for the current sampling period;
updating a plurality of internal variables; and
determining a partial product.

3. The apparatus of claim 1, wherein said at least one extension instruction comprises an extension instruction adapted to perform a signed multiplication of a coefficient by a state variable, and add the result to the value held by an accumulator of an arithmetic logic unit.

4. The apparatus of claim 1, wherein said extension instruction is optimized for iterative performance of a multiplication and addition operation.

5. The apparatus of claim 1, wherein said at least one extension instruction is adapted to perform primary functions related to said real-time control applications, and said base instruction set is adapted to perform secondary functions associated with said real-time control applications.

6. The apparatus of claim 5, wherein said primary functions comprise at least repeated signed multiplication of a coefficient by a state variable, and add the result to the value held by an accumulator of an arithmetic logic unit.

7. The apparatus of claim 6, wherein said secondary functions relate to a state-space control system model.

8. An apparatus comprising:
a user-configured and extended digital processor core, comprising:
a base instruction set, said set comprising a plurality of instructions adapted to run on said core;
at least one extension instruction adapted to run on said core, said at least one extension instruction being user-designated, and optimized for real-time control applications;
a pipeline apparatus, comprising:
an instruction fetch stage;
an instruction decode stage operatively coupled downstream of said fetch stage;
an execution stage operatively coupled downstream of said decode stage; and
a writeback stage operatively coupled downstream of said execution stage;
wherein said fetch, decode, execute, and writeback stages are adapted to process a plurality of instructions of at least said base instruction set comprising a first plurality of 16-bit instructions and a second plurality of 32-bit instructions, without switching modes; and
extension hardware operatively coupled to said pipeline of said core, said extension hardware facilitating the running of said at least one extension instruction by said core;
a storage device in data communication with said processor core; and
at least one algorithm disposed at least partly in said storage device, said at least one algorithm being adapted to provide an output useful for real-time control applications based on at least one input and a plurality of state variables, said algorithm utilizing said at least one extension instruction to optimize the operation thereof.

9. The apparatus of claim 8, wherein said algorithm is adapted to perform iterative calculations within a loop, said act of performing iterative calculations performed according to the method, comprising:
reading a new input sample;
calculating the output value for the current sampling period;
updating a plurality of internal variables; and
determining a partial product.

10. The apparatus of claim 8, wherein said at least one extension instruction comprises an extension instruction adapted to perform a signed multiplication of a coefficient by a state variable, and add the result to the value held by an accumulator of an arithmetic logic unit.

11. The apparatus of claim 8, wherein said extension instruction is optimized for iterative performance of a multiplication and addition operation.

12. The apparatus of claim 8, wherein said at least one extension instruction is adapted to perform primary functions related to said real-time control applications, and said base instruction set is adapted to perform secondary functions associated with said real-time control applications.

13. The apparatus of claim 12, wherein said primary functions comprise at least repeated signed multiplication of a coefficient by a state variable, and add the result to the value held by an accumulator of an arithmetic logic unit.

14. The apparatus of claim 13, wherein said secondary functions relate to a state-space control system model.

15. An apparatus comprising:
a user-configured and extended digital processor core having a pipeline, comprising:
a base instruction set, said set comprising a plurality of instructions adapted to run on said core;
at least one extension instruction adapted to run on said core, said at least one extension instruction being user-designated, and optimized for real-time control applications; and
extension hardware operatively coupled to said pipeline of said core, said extension hardware facilitating the running of said at least one extension instruction by said core;
a storage device in data communication with said processor core; and
at least one algorithm disposed at least partly in said storage device, said at least one algorithm being adapted to provide an output useful for real-time control applications based on at least one input and a plurality of state variables, said at least one algorithm utilizing said at least one extension instruction to optimize the operation thereof;
wherein said base instruction set comprises:
a plurality of first instructions having a first length;
a plurality of second instructions having a second length; and wherein said processor core further comprises logic adapted to decode and process both said first length and second length instructions from a single program having both first and second length instructions contained therein, wherein said first length is less than said second length; and
said first instructions occur more frequently within said single program than said second instructions.

16. An apparatus comprising:
a user-configured and extended digital processor core, comprising:
a base instruction set, said set comprising a plurality of instructions adapted to run on said core;
at least one extension instruction adapted to run on said core, said at least one extension instruction being user-designated, and optimized for real-time control applications;
a pipeline apparatus, comprising:
an instruction fetch stage;
an instruction decode stage operatively coupled downstream of said fetch stage;
an execution stage operatively coupled downstream of said decode stage; and
a writeback stage operatively coupled downstream of said execution stage;
wherein said fetch, decode, execute, and writeback stages are adapted to process a plurality of instructions of at least said base instruction set comprising a first plurality of 16-bit instructions and a second plurality of 32-bit instructions, without switching modes; and
extension hardware operatively coupled to said pipeline of said core, said extension hardware facilitating the running of said at least one extension instruction by said core;
a storage device in data communication with said processor core; and
at least one algorithm disposed at least partly in said a storage device, said at least one algorithm being adapted to provide an output useful for real-time control applications based on at least one input and a plurality of state variables, said at least one algorithm utilizing said at least one extension instruction to optimize the operation thereof.

17. The apparatus of claim 1, wherein said at least one algorithm, said at least one extension instruction, and said extension hardware collectively implement a state-space representation of an LTI controller function.

18. The apparatus of claim 1, further comprising a plurality of formats adapted to represent coefficients and state variables associated with said at least one algorithm.

19. The apparatus of claim 18, wherein at least one of said plurality of formats comprises a coefficient format, said coefficient format comprising a low-precision floating-point form having a mantissa portion and an exponent portion.

20. The apparatus of claim 19, wherein the position of a binary point in said mantissa portion is predetermined to allow for fractional values.

21. The apparatus of claim 8, wherein said at least one algorithm, said at least one extension instruction, and said extension hardware collectively implement a state-space representation of an LTI controller function.

22. The apparatus of claim 8, further comprising a plurality of formats adapted to represent coefficients and state variables associated with said at least one algorithm.

23. The apparatus of claim 22, wherein at least one of said plurality of formats comprises a coefficient format, said coefficient format comprising a low-precision floating-point form having a mantissa portion and an exponent portion.

24. The apparatus of claim 23, wherein the position of a binary point in said mantissa portion is predetermined to allow for fractional values.

25. An apparatus comprising:
a user-configured and extended digital processor core, comprising:
a base instruction set, said set comprising a plurality of instructions adapted to run on said core;
at least one extension instruction adapted to run on said core, said at least one extension instruction being user-designated, and optimized for real-time control applications;
a pipeline apparatus, comprising:
an instruction fetch stage;
an instruction decode stage operatively coupled downstream of said fetch stage;
an execution stage operatively coupled downstream of said decode stage;
a writeback stage operatively coupled downstream of said execution stage;
wherein said fetch, decode, execute, and writeback stages are adapted to process a plurality of instructions of at least said base instruction set comprising a first plurality of instructions comprising a first length and a second plurality of instructions comprising a second length, without switching modes; and
extension hardware operatively coupled to said pipeline of said core, said extension hardware facilitating the running of said at least one extension instruction by said core;
a storage device in data communication with said processor core; and
at least one algorithm disposed at least partly in said storage device, said at least one algorithm being adapted to provide an output useful for real-time control applications based on at least one input and a plurality of state variables, said algorithm utilizing said at least one extension instruction to optimize the operation thereof.

26. The apparatus of claim 25, wherein said at least one algorithm, said at least one extension instruction, and said extension hardware collectively implement a state-space representation of an LTI controller function.

27. The apparatus of claim 25, further comprising a plurality of formats adapted to represent coefficients and state variables associated with said at least one algorithm.

28. The apparatus of claim 27, wherein at least one of said plurality of formats comprises a coefficient format, said coefficient format comprising a low-precision floating-point form having a mantissa portion and an exponent portion.

29. The apparatus of claim 28, wherein the position of a binary point in said mantissa portion is predetermined to allow for fractional values.

* * * * *